(12) United States Patent
Looijkens

(10) Patent No.: US 6,490,107 B2
(45) Date of Patent: Dec. 3, 2002

(54) RECORDING/REPRODUCING APPARATUS HAVING CLOCK GENERATING MEANS FOR GENERATING ALL OF THE REQUIRED CLOCK SIGNALS FROM A SINGLE REFERENCE CRYSTAL

(75) Inventor: Marinus Adrianus Henricus Looijkens, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 3 days.

(21) Appl. No.: 09/756,934

(22) Filed: Jan. 9, 2001

(65) Prior Publication Data

US 2001/0024336 A1 Sep. 27, 2001

(30) Foreign Application Priority Data

Jan. 10, 2000 (EP) .............................. 00200066

(51) Int. Cl.$^7$ ................................ G11B 5/02

(52) U.S. Cl. ..................... 360/27; 360/51; 386/65

(58) Field of Search .............................. 360/51, 46, 13, 360/49, 72, 2, 48, 27; 386/52, 55, 60, 61, 62, 65

(56) References Cited

U.S. PATENT DOCUMENTS 5,953,483 A       9/1999   Van Gestel et al.
6,341,193 B1 *    1/2002   Schipper ...................... 386/65

FOREIGN PATENT DOCUMENTS

WO       WO9630905       10/1996
WO       WO9965027       12/1999

* cited by examiner

*Primary Examiner*—Alan T. Faber
(74) *Attorney, Agent, or Firm*—Edward W. Goodman

(57) ABSTRACT

Recording/reproducing apparatus for recording/reproducing serial information stream of A/V signals comprising packets of information signals, such as MPEG Transport Packets, on/from a recording medium. The apparatus includes a time stamping unit for time stamping received information packets in accordance with a time stamping clock reference, a writing unit for recording the information packets in accordance with a write clock reference, and a reading unit for reproducing the information packets in accordance with a read clock reference. All clock references are derived from a single crystal clock reference. The read clock reference has a frequency equal to the frequency of the single crystal clock reference, this frequency being an integer multiple of the frequency of the write clock reference. The time stamp clock reference has a frequency derived from the single crystal clock reference by a digital counter.

8 Claims, 2 Drawing Sheets

RECORDING/REPRODUCING APPARATUS HAVING CLOCK GENERATING MEANS FOR GENERATING ALL OF THE REQUIRED CLOCK SIGNALS FROM A SINGLE REFERENCE CRYSTAL

BACKGROUND OF THE INVENTION

1. Field of the Invention

The invention relates to an apparatus having receiving means for receiving an information signal comprising packets of information signals that occur regularly as a function of time in a serial data stream of the received information signal, time stamping means for time stamping the packets comprised in the received information signal using a time stamp clock reference, writing means for recording the time-stamped packets in at least one track of a record carrier, employing a write clock reference for synchronizing the writing means, and reading means linked with detector means for reproducing the recorded time-stamped information signal from the at least one track of the record carrier using a read clock reference for sampling the recorded information signal.

2. Description of the Related Art

In current day practice, use is made of at least two different and independent crystal clock generators, one for sampling the information signal which is retrieved from the record carrier and for generation of a first stamp reference clock, and one separate crystal clock for synchronizing the writing means. Particularly, the synchronizing frequency of the latter clock requires accuracy in the choice of frequency in order to conform to the information signal channel bit rate.

SUMMARY OF THE INVENTION

It is the aim of the invention to reduce the number of components used in the known apparatus without compromising the requirements of the recording and reproducing process of the known apparatus.

According to a first aspect of the invention, the apparatus comprises clock generating means with a single reference crystal for generating the clock reference signals. Advantageously, the single reference crystal is chosen to generate a single reference signal of a frequency of an integer multiple of the write clock reference signal.

This provides the opportunity to maintain the required accuracy of the writing operation by applying a divider in order to generate the required write clock signal derived from the single reference signal from the clock generating means, which satisfies the writing frequency.

Particularly, when the frequency of the single clock reference is chosen at three times the frequency of the write clock signal, the clock generating means provides a frequency in a reproducing mode with an over-sampling factor of 3, which facilitates an improvement in respect of the signal quality.

A further advantageous embodiment of a recording/reproducing apparatus, wherein the received information signal comprises program clock reference (PCR) signals, is characterized in that the apparatus comprises counter means for generating the time stamp clock reference using the received program clock reference (PCR) signals and the single clock reference signal.

Preferably a counter, as described in International Patent Application No. WO99/65027, corresponding to U.S. Pat. No. 6,341,193 (PHN 16.942), is used.

A further embodiment is characterized in that the counter means provides a time stamp reference signal with a frequency of 27 MHz.

BRIEF DESCRIPTION OF THE DRAWINGS

These and other aspects of the invention will be apparent from and elucidated further with reference to the embodiments described by way of example in the following description and with reference to the accompanying drawings, in which.

Corresponding elements in different Figures have identical reference numerals.

DESCRIPTION OF THE PREFERRED EMBODIMENTS

Figure 1:
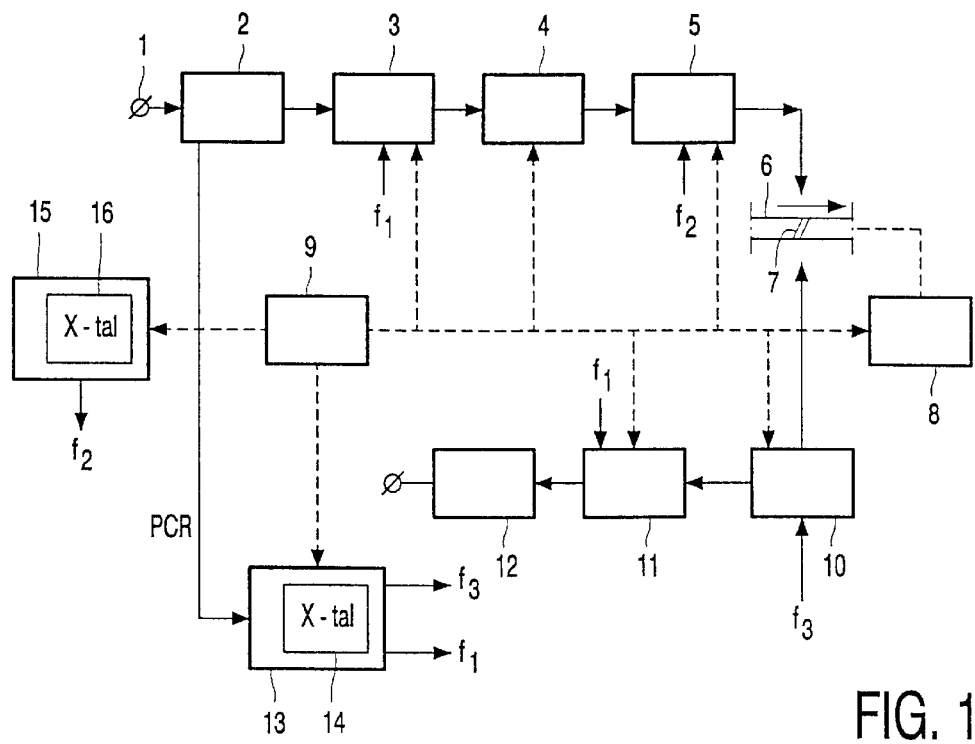
FIG. 1 shows a known recording/reproducing apparatus.

FIG. 1 shows a known recording/reproducing apparatus. This may be an apparatus of the type as disclosed in International Patent Application No. WO99/65027 (PHN 16.942) or International Patent Application No. WO 96/30905, corresponding to U.S. Pat. No. 5,953,483 (PHN 15.260).

A received information signal received at an input terminal 1 with receiving means 2 comprises packets of information signals according to the MPEG-standard, according to ISO/IEC 13.818, part 1 'Systems', ISO/IEC 13.818, part 2 'Video' and ISO/IEC 13.818, part 3 'Audio'. The packets, called Transport Packets, are received at regular time intervals. In order to reproduce this time relation when reproducing, these packets are time stamped with time stamping circuitry 3, using a time stamp clock reference signal f1, with a frequency of 27 MHz. It is noted that this time stamp reference signal f1 is locked to the external time base used for generating the received information signals, by locking to simultaneously and regularly transmitted Program Clock references (PCR).

The time stamped packets are further channel encoded with channel encoding means 4 and submitted to writing means 5. In case of recording on a magnetic tape 6 according to a D-VHS standard, this recording has to be done with a fixed writing frequency of 19.138560 MHz. For this purpose a write clock reference signal f2 is supplied to the writing means 5.

The information signals are written on tracks 7 of a magnetic tape 6 using writing heads of the magnetic type. Alternatively, a recording medium in the form of a disc, either of the optically or magnetically readable/recordable type, may be employed. Suitable tape drive means 8 is controlled by central control means 9, which control all other units, as indicated with dashed lines. Detecting means 10 detects the magnetized areas on the magnetic tape 6, with a sampling rate of 54 MHz, supplied by the read clock reference signal f3. Reading means 11 decodes the detected channel coded signal. Finally, suitable decoding means 12 decodes the packets of information signals to audio/video signals. Herewith the time relationship between the originally received packets is restored meanwhile using the time stamp reference signal f1. First clock reference means 13, comprising a crystal-clock 14 generating a 54 MHz clock frequency, is used to generate the time stamp clock reference signal f1 with a frequency of 27 MHz and the read reference clock reference f3 with a frequency of 54 MHz. A second clock reference means 15, comprising a second crystal clock 16 generating a 19.138560 MHz frequency, is used to generate the write clock reference signal f2 with a frequency of 19.138560 MHz.

Figure 2:
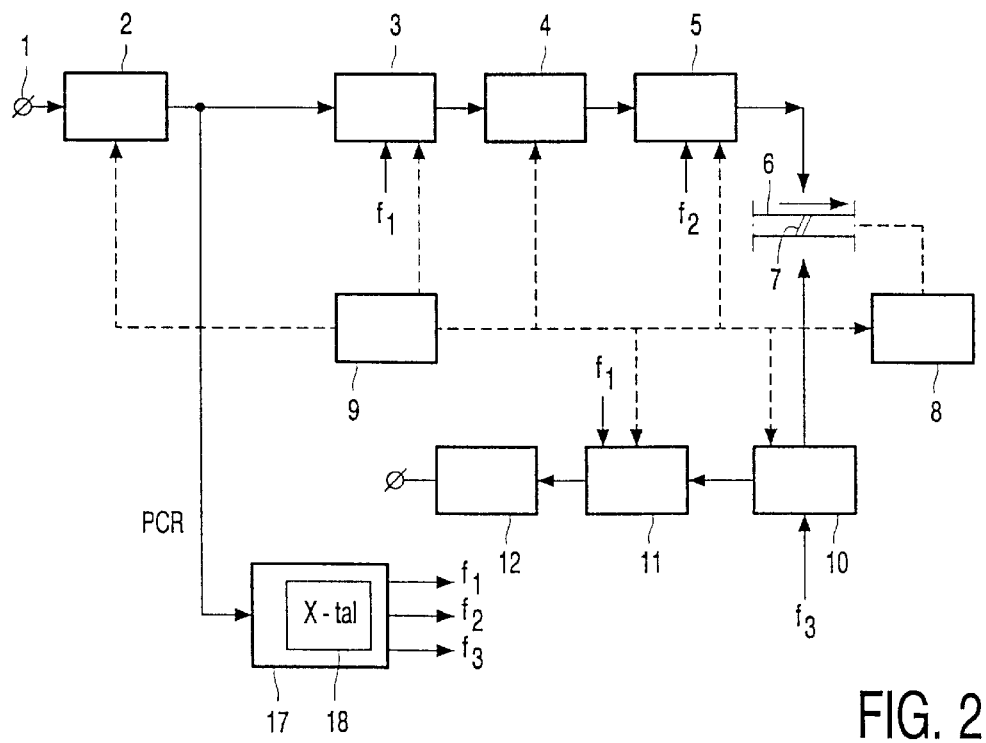
FIG. 2 shows, schematically, a preferred embodiment of a recording/reproducing apparatus according to the invention.

FIG. 2 shows a recording/reproducing device according to a preferred embodiment of the invention. Identical numerals refer to corresponding elements in FIG. 1, which will not be discussed again. Signal clock reference generating means 17 is shown for generating the clock reference signals f1, f2 and f3. One single crystal clock 18 is provided, generating a single clock reference signal with a frequency of 57.4155 MHz. This frequency is preferably chosen to be three times the channel bit rate or frequency of the write clock reference signal f2, being 19.138560 MHz. This write clock reference signal may easily be obtained with frequency dividing means, not shown in the figure. The single clock reference signal is used to generate the read clock reference signal f3, providing an over-sampling over 3.

Finally, the time stamp clock reference signal f1 is also derived from this single clock reference signal of a frequency of 57.4155 MHz. This will be explained with reference to FIGS. 3A and 3B.

Figure 3A:
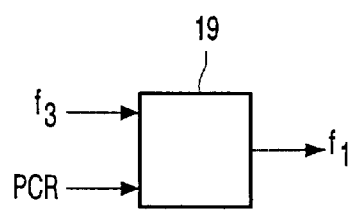
FIGS. 3A and 3B show a counter of FIG. 2 in more detail.

FIG. 3A shows a system time counter (STC) 19 of the type as disclosed in the international patent application with the application number IB 99/00980 (PHN 16.942), which is incorporated herein by reference. The single reference signal, which is also used as the read clock reference signal f3, is supplied with received Program clock Reference (PCR) signals to the System Time Counter (STC) 19. These Program Clock Reference (PCR) signals contain the time base of the received information signals when generated and are being transmitted regularly with the information signals. The System Time Counter (STC) 19, generates a time stamps clock reference f1 locked to the time base of the received information signals.

Figure 3B:
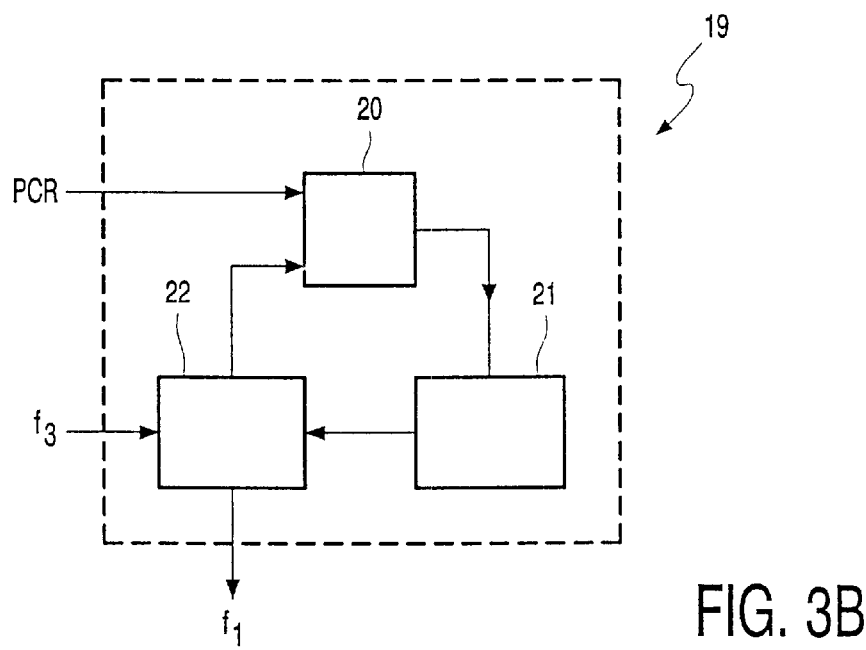

FIG. 3B illustrates the System Time Counter (STC) 19 of FIG. 3A, in more detail. A comparator 20 compares the Program Clock Reference (PCR) signal with a current count value of the System Time counter. The output of the comparator 20 is coupled to a generating unit 21 which supplies a System Time Clock increment value to an adder unit 22. The single reference clock signal f3 is also supplied to the adder unit 22. The generator System Time Clock reference signal, corresponding with the required time stamp reference clock is obtained from adder unit 22, in a manner as described in International Patent Application No. WO99/65027, which will not be discussed further.

Figure 4:
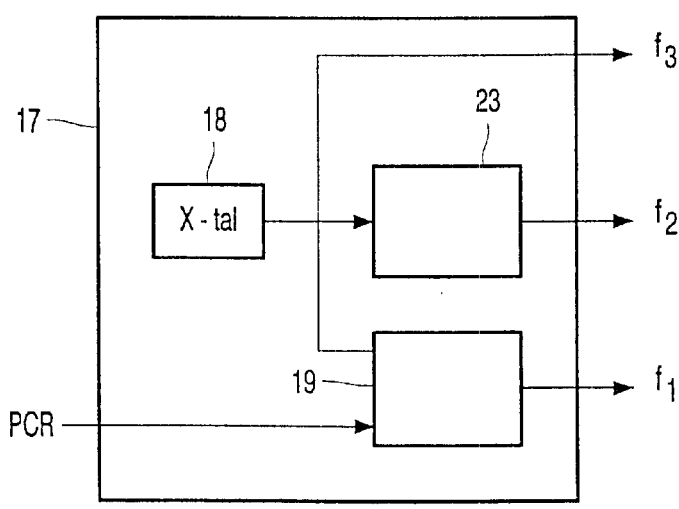
FIG. 4 shows circuitry to be used in another embodiment of the invention.

FIG. 4 finally discloses circuitry embodying the single clock reference generating means 17 of FIG. 2, comprising a single crystal 18, a System Time Clock 19 and a frequency divider 23.

While the invention has been derived with reference to preferred embodiments thereof, it is to be understood that these are not limitative examples. Thus, various modification will become apparent to those skilled in the art, without departing from the scope of the invention, as defined by the claims. Further, the invention lies in each and every novel feature or combination of features.

What is claimed is:

1. A recording/reproducing apparatus comprising:
  receiving means for receiving an information signal, the received information signal comprising packets of information signals occurring regularly as a function of time in a serial data stream of the received information signal;
  time stamping means for time stamping the packets comprised in the received information signal using a time stamp clock reference signal;
  writing means for recording an information signal comprising the time-stamped packets in at least one track of a record carrier, using a write clock reference signal for synchronizing the writing means; and
  reading means linked with detector means for reproducing the recorded time-stamped packets from at least one track of the record carrier using a read clock reference signal for sampling the recorded information signal, characterized in that the recording/reproducing apparatus further comprises:
  clock generating means having a single reference crystal for generating the time stamp clock reference signal, the write clock reference signal and the read clock reference signal.

2. The recording/reproducing apparatus as claimed in claim 1, characterized in that the single reference crystal generates a single reference signal having a frequency of an integer multiple of the write clock reference signal.

3. A recording/reproducing apparatus comprising:
  receiving means for receiving an information signal, the received information signal comprising packets of information signals occurring regularly as a function of time in a serial data stream of the received information signal;
  time stamping means for time stamping the packets comprised in the received information signal using a time stamp clock reference signal;
  writing means for recording an information signal comprising the time-stamped packets in at least one track of a record carrier, using a write clock reference signal for synchronizing the writing means;
  reading means linked with detector means for reproducing the recorded time-stamped packets from at least one track of the record carrier using a read clock reference signal for sampling the recorded information signal; and
  clock generating means having a single reference crystal for generating the time stamp clock reference signal, the write clock reference signal and the read clock reference signal, wherein the single reference crystal generates a single reference signal having a frequency of an integer multiple of the write clock reference signal,
  characterized in that the frequency of the single clock reference is three times the frequency of the write clock signal.

4. The recording/reproducing apparatus as claimed in claim 1, wherein the received information signal comprises program clock reference signals, characterized in that the clock generating means further comprises:
  counter means for generating the time stamp clock reference signal using the received program clock reference signals and the single reference signal.

5. The recording/reproducing apparatus as claimed in claim 4, characterized in that the counter means provides the time stamp clock reference signal with a frequency of 27 MHz.

6. A recording/reproducing apparatus comprising:
  receiving means for receiving an information signal, the received information signal comprising packets of information signals occurring regularly as a function of time in a serial data stream of the received information signal;

time stamping means for time stamping the packets comprised in the received information signal using a time stamp clock reference signal;

writing means for recording an information signal comprising the time-stamped packets in at least one track of a record carrier, using a write clock reference signal for synchronizing the writing means;

reading means linked with detector means for reproducing the recorded time-stamped packets from at least one track of the record carrier using a read clock reference signal for sampling the recorded information signal; and clock generating means having a single reference crystal for generating the time stamp clock reference signal, the write clock reference signal and the read clock reference signal, wherein the single reference crystal generates a single reference signal having a frequency of an integer multiple of the write clock reference signal, characterized in that the frequency of the single reference signal is 57.4155 MHz.

7. The recording/reproducing apparatus as claimed in claim 1, characterized in that the apparatus interfaces with a record carrier comprising a magnetically readable tape.

8. A circuit for use in the recording/reproducing apparatus as claimed in any one of the claims 1–7, said circuit comprising clock generating means with a single reference crystal and counter means for providing:

a) a read clock reference signal for the detector means of said apparatus;

b) a write clock reference signal for synchronization of the writing means of said apparatus; and c) a time stamp clock reference signal.

* * * * *